United States Patent
Sakurai

(10) Patent No.: US 8,045,186 B2
(45) Date of Patent: Oct. 25, 2011

(54) IMAGE PROCESSING APPARATUS, IMAGE PROCESSING METHOD, COMPUTER READABLE MEDIUM AND DATA SIGNAL

(75) Inventor: Takuya Sakurai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1008 days.

(21) Appl. No.: 11/598,058

(22) Filed: Nov. 13, 2006

(65) Prior Publication Data
US 2007/0188782 A1   Aug. 16, 2007

(30) Foreign Application Priority Data
Feb. 14, 2006 (JP) .............................. P.2006-035952

(51) Int. Cl.
*G06K 15/00* (2006.01)
(52) U.S. Cl. ........ 358/1.12; 358/1.2; 358/2.1; 358/2.99; 382/167
(58) Field of Classification Search ................. 358/1.15; 396/310, 549
See application file for complete search history.

(56) References Cited

U.S. PATENT DOCUMENTS

| | | | | |
|---|---|---|---|---|
| 6,058,207 | A * | 5/2000 | Tuijn et al. ..................... | 382/162 |
| 6,608,942 | B1 * | 8/2003 | Le ................................. | 382/279 |
| 6,714,673 | B1 | 3/2004 | Ohta ............................. | 358/167 |
| 6,766,050 | B1 | 7/2004 | Saikawa et al. ............... | 382/162 |
| 2004/0057614 | A1 | 3/2004 | Ogatsu et al. | |
| 2005/0105111 | A1 * | 5/2005 | Ott et al. ........................ | 358/1.9 |
| 2008/0056563 | A1 * | 3/2008 | Schiller et al. ................. | 382/159 |

FOREIGN PATENT DOCUMENTS

| | | |
|---|---|---|
| JP | A-2001-45516 | 2/2001 |
| JP | A-2001-94784 | 4/2001 |
| JP | A-2003-39737 | 2/2003 |
| JP | 2004-112694 | 4/2004 |
| JP | 2004-153667 | 5/2004 |
| JP | 2004-240829 | 8/2004 |
| JP | 2006-031375 | 2/2006 |

OTHER PUBLICATIONS

Japanese English Translation, JP—2004/153667 Kumada Shuichi.*

* cited by examiner

*Primary Examiner* — Benny Tieu
*Assistant Examiner* — Marcellus Augustin
(74) *Attorney, Agent, or Firm* — Morgan, Lewis & Bockius LLP

(57) ABSTRACT

An image processing system includes a profile generating section, a designating section, a calculating section and a correcting section. The profile generating section generates a color conversion profile based on first colorimetric values obtained from a first color chart output from a target device and second colorimetric values obtained from a second color chart from an output device other than the target device. The calculating section calculates difference information between a first data value obtained by converting a designated color into a device-independent color space and a second data value obtained by converting the designated color using the color conversion profile into a second color and converting the second color using the device-independent color space. The correcting section corrects the first colorimetric values based on the difference information. The profile generating section generates the color conversion profile again based on the corrected first colorimetric values.

12 Claims, 3 Drawing Sheets

IMAGE PROCESSING APPARATUS, IMAGE PROCESSING METHOD, COMPUTER READABLE MEDIUM AND DATA SIGNAL

BACKGROUND

1. Technical Field

The invention relates to an image processing system, an image processing method, a computer readable medium storing an image processing program, and a data signal, which can make color conversion of a color image. Particularly, it relates to an image processing system programmed on a computer-readable medium, an image processing program and an image processing method suitable for use in a color proof system.

2. Description of the Related Art

A so-called color proof system in which a trial proof obtained by simulating a print color with using a simplified color printer (such as an electrophotographic printer or an ink-jet printer) is output so that color proofreading is performed on the basis of the trial proof in a process before a printed matter is formed by a press (such as a rotary press for forming a final printed matter) has been used in the color printing trade in recent years.

To perform color proofreading by using such a color proof system, a color reproducible by a press needs to be reproduced by a color printer. Incidentally, the printing press and the color printer are print output devices different from each other, so that the printing press and the color printer are different from each other in device-dependent color characteristic. Therefore, a combination of colorimetric data obtained by measuring a color chart of color patches output from the printing press and CMYK data corresponding to the colorimetric data and a combination of colorimetric data obtained by measuring a color chart output from the color printer and CMYK data corresponding to the colorimetric data are used in the color proof system when color proofreading is performed. A printing press color profile is generated from the combination of colorimetric data and CMYK data with respect to the printing press whereas a printer profile is generated from the combination of colorimetric data and CMYK data with respect to the color printer. The printing press color-dependent CMYK data used for color proofreading are converted into a device-independent color space, such as an XYZ color space or an L*a*b* color space defined by CIE (Commission International de l'Eclairage), by the printing press color profile and then further converted into color printer-dependent CMYK data by the printer profile. In this manner, a color proof sample approximate to the printing press color generated by the printing press can be obtained by the color printer. Accordingly, the printing press color generated by the printing press can be simulated by the color printer, so that simple color proofreading can be performed before pressing is made by the printing press.

SUMMARY

According to an aspect of the invention, an image processing system programmed on a computer-readable medium includes a profile generating section, a designating section, a calculating section and a correcting section. The profile generating section generates a color conversion profile on a basis of (i) first colorimetric values obtained from a first color chart, which including a plurality of first color patches and is output from a target device, and (ii) second colorimetric values obtained from a second color chart, which include a plurality of second color patches and is output from an output device other than the target device. The color conversion profile is used for converting color data depending on the target device into color data depending on the output device. The designating section designates a color. The calculating section calculates difference information between (i) a first data value obtained by converting the designated color into a device-independent color space and (ii) a second data value obtained by converting the designated color using the generated color conversion profile into a second color and then converting the second color using the device-independent color space. The correcting section corrects the first colorimetric values based on the calculated difference information. The correcting section causes the profile generating section to generate the color conversion profile again based on the corrected first colorimetric values and the second colorimetric values.

BRIEF DESCRIPTION OF THE DRAWINGS

Exemplary embodiments of the present invention will be described in detail based on the following figures, wherein.

DETAILED DESCRIPTION

An image processing system programmed on a computer-readable medium, a computer readable medium storing an image processing program, an image processing method and a data signal according to an exemplary embodiment of the invention will be described below with reference to the drawings.

First, the schematic configuration of the image processing system will be described while the case where the image processing system is applied to a color proof system is taken as an example. A color proof obtained by simulating a print color of a target device, which is a printing press, is output from a simplified color printer, which is an output device. The color proof system performs color proofreading on the basis of the color proof as a process before a printed matter is generated by the printing press.

Figure 1:
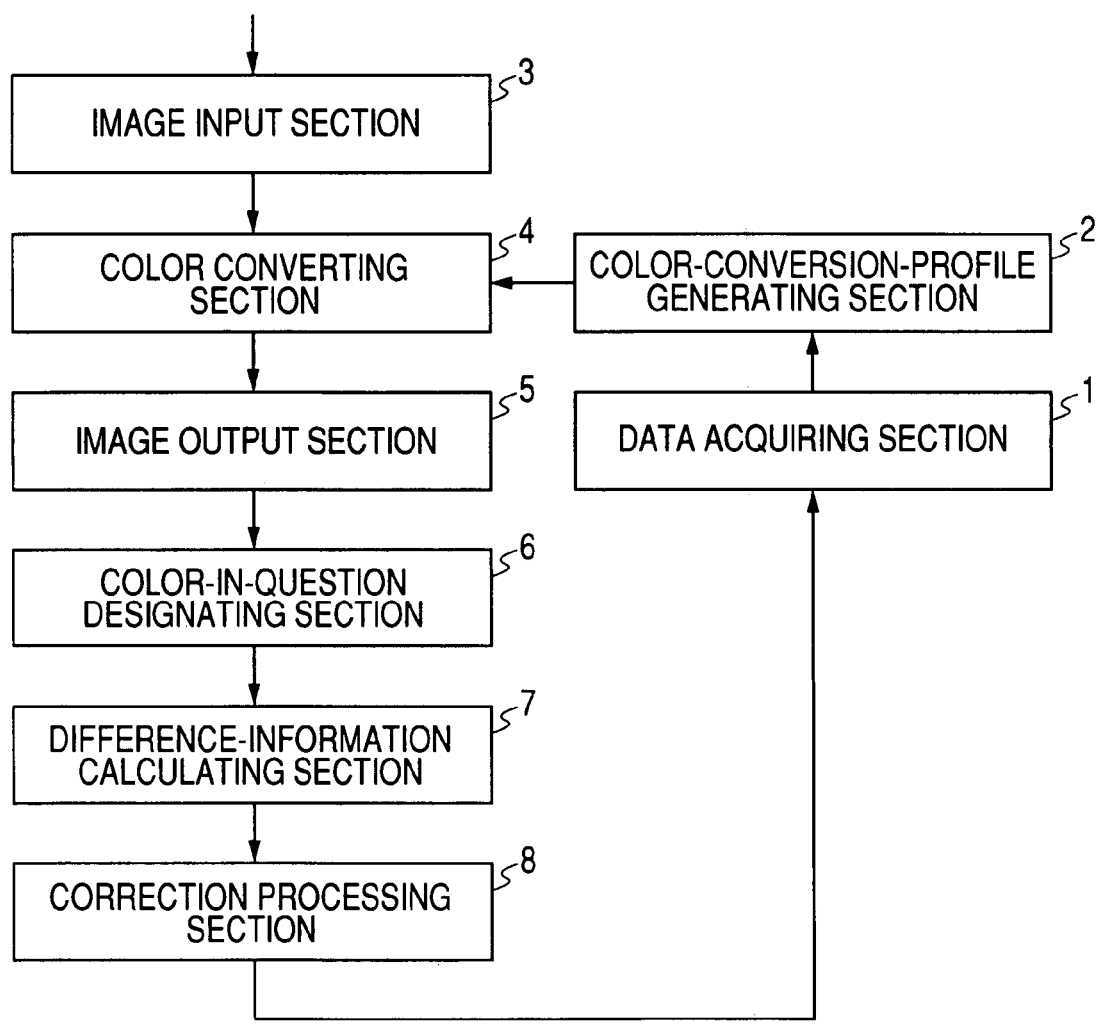
FIG. 1 is a functional block diagram showing an example of schematic configuration of an image processing system according to an exemplary embodiment of the invention.

FIG. 1 is a functional block diagram showing an example of the schematic configuration of the image processing system according to the exemplary embodiment of the invention. As shown in FIG. 1, the image processing system includes a data acquiring section 1, a color-conversion-profile generating section 2, an image input section 3, a color converting section 4, an image output section 5, a color-in-question designating section 6, a difference-information calculating section 7, a correction processing section 8.

The data acquiring section 1 acquires data necessary for generating a color conversion profile. The term "color conversion profile" means a profile used to convert CMYK data, which is color data depending on a target device, into CMYK data, which is color data depending on an output device, so that print color simulation can be achieved by the output device. Data necessary for generating the color conversion profile are decided by a color conversion profile generating method used in the color-conversion-profile generating section 2. For example, the color conversion profile generating method uses a combination of colorimetric data obtained by measuring a color chart of color patches output from the target device and CMYK data corresponding to the colorimetric data, and a combination of colorimetric data obtained by measuring a color chart of color patches output from the output device and CMYK data corresponding to the colorimetric data. The color chart in the target device and the color chart in the output device may be different from each other in the number of color patches. For example, one color chart may have 1000 color patches whereas the other color chart may have 900 color patches. Or the color chart in the target device and the color chart in the output device may be equal to each other in the number of color patches.

The color-conversion-profile generating section 2 generates a color conversion profile used to convert color data depending on the target device into color data depending on the output device, on the basis of the data acquired by the data acquiring section 1. For example, the following method may be used as a color conversion profile generating method. That is, each of color data (a combination of colorimetric data and CMYK data) concerned with the target device and color data (a combination of colorimetric data and CMYK data) concerned with the output device are converted into device-independent color space data (such as L*a*b* data). Then, if necessary, color matching is performed to extract a difference between the two kinds of device-independent color space data. A color conversion profile is generated so that the difference can be eliminated. Incidentally, generation of the color conversion profile is not limited to this method. Another known technique may be used in generating of the color conversion profile.

The image input section 3 is provided for inputting a color image, which is a subject of color proofreading, that is, image data to be output by trial proof. Incidentally, the input technique is not particularly limited. Data communication through a communication line may be used or data reading from a recording medium may be used or data may be input through a user's operation.

The color converting section 4 converts color data of the color image input by the image input section 3 from color data depending on the target device into color data depending on the output device by using the color conversion profile generated by the color-conversion-profile generating section 2.

The image output section 5 causes the output device to output and print color data of the color image, which is color-converted by the color converting section 4, that is, color data depending on the output device.

The color-in-question designating section 6 designates a color to be subjected to correction of color reproduction error between the color image output from the target device and the color image output from the output device. The color may be designated in such a manner that the color image (proof sample) output from the image output section 5 and the color image (target sample) output from the target device are observed so as to be compared with each other so that a user selects a color or region notable in terms of color reproduction error. The designation of the color may be performed in such a manner that a pixel or region of a color is specified by use of a pointing device, a mouse pointer or the like on the color images displayed on a display unit or the like. Also, the color may be designated in such a manner that a color or region notable in terms of error is measured and that a result of the measurement is input through a keyboard, a communication line or the like. Incidentally, when plural colors are contained in the designated pixel or designated region, for example, when the region is designated, a mean, a median or a modal value of the plural colors may be used as the designated color.

The difference-information calculating section 7 calculates difference information between a data value obtained by converting the color designated by the color-in-question designating section 6 into a device-independent color space (such as an L*a*b* color space) and a data value obtained by converting the designated color into a second color using the color conversion profile generated by the color-conversion-profile generating section 2 and then converting the second color into a device-independent color space (such as an L*a*b* color space). As an example, a predetermined color conversion table or a predetermined color conversion formula may be used in converting into the device-independent color space. As another example, a color prediction model using a neural network may be used in converting into the device-independent color space. As further another example, a result of the conversion into the device-independent color space may be obtained in such a manner that patches including the designated color are output from the target device and a result of the output is measured. As still further another example, a color approximate to the designated color may be converted without direct conversion of the designated color. That is, when it is difficult to convert the designated color directly, a result of conversion into a device-independent color space is easily obtained by such an approximate conversion manner that a color approximate to the designated color is selected from the color chart output from the target device and that a result of the conversion of the selected color approximate to the designated color is regarded as a result of the conversion of the designated color.

The correction processing section 8 reflects the difference information calculated by the difference-information calculating section 7 onto colorimetric values, which have been obtained from the color chart output from the target device and which have been acquired by the data acquiring section 1. That is, the correction processing section 8 corrects the colorimetric values obtained from the color chart output from the target device on the basis of the difference information calculated by the difference-information calculating section 7. Then, the correction processing section 8 instructs the color-conversion-profile generating section 2 to generate a color conversion profile on the basis of the corrected colorimetric value again. Incidentally, to correct the colorimetric value, as will be described later, the correction processing section 8 may assign different weights to respective components of the difference information; vary correction amounts for the colorimetric values in accordance with distances on the device-independent color space between the colorimetric values and the designated color; or correct only a part of the first colorimetric values, which is within a predetermined range from the designated color on the device-independent color space.

Each of these sections 1 to 8 may be implemented in such a manner that the computer function of the image processing system executes a predetermined program. In this case, the predetermined program may be provided in a state where the predetermined program is stored in a computer-readable recording medium or distributed through a wire or wireless communication means before the predetermined program is installed in the image processing system. That is, each of these portions 1 to 8 can be achieved by an image processing program which can be installed in the image processing system.

An example of processing operation by the image processing system configured as described above (including the case where the processing operation is implemented by an image processing program), that is, an image processing method according to the exemplary embodiment of the invention will be described below.

Figure 2:
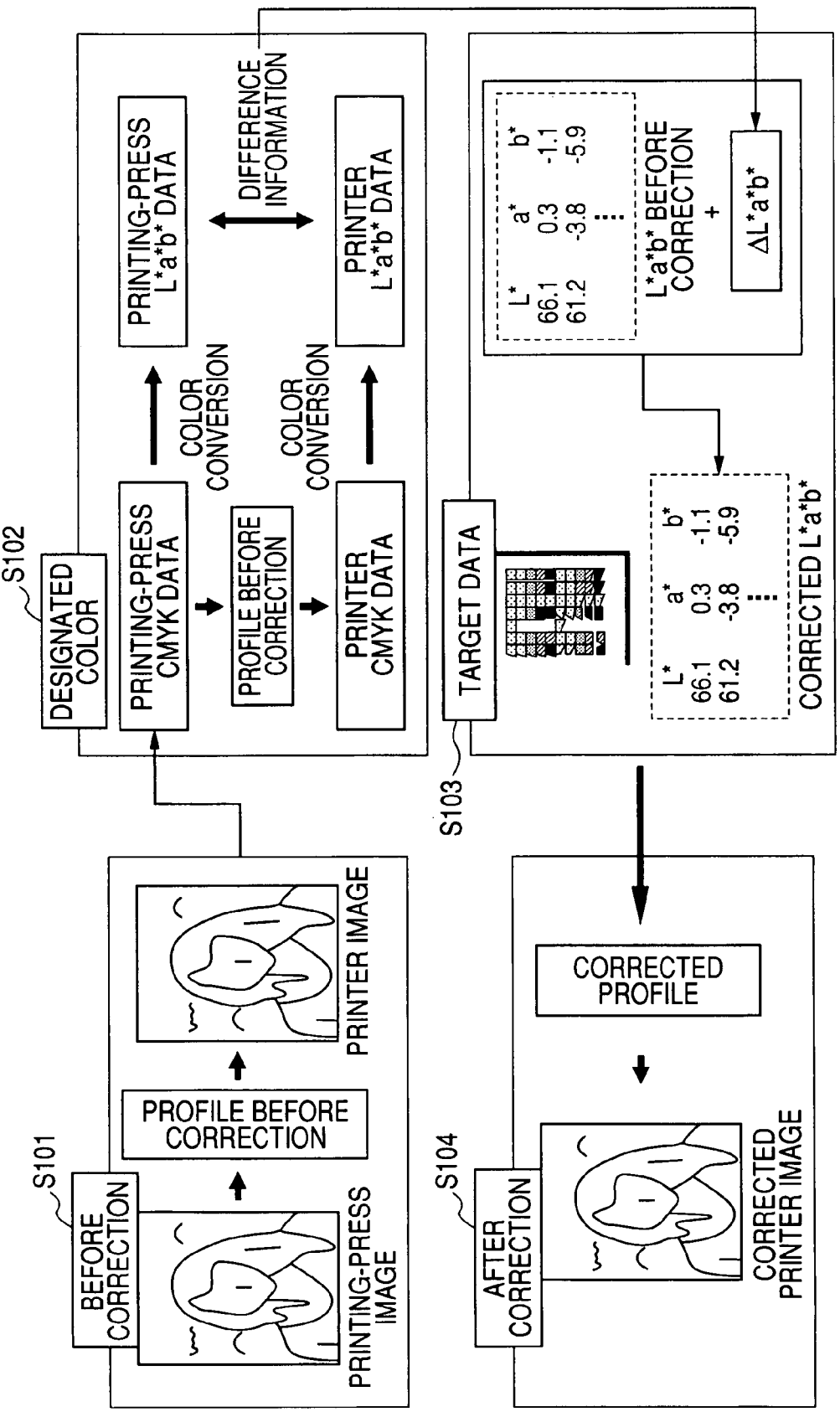
FIG. 2 is an explanatory view typically showing the outline of an image processing method according to the exemplary embodiment of the invention.

FIG. 2 is an explanatory view typically showing the outline of the image processing method according to the exemplary embodiment of the invention. As shown in FIG. 2, in an initial state (step 101 in which the step is hereinafter abbreviated as "S") of processing operation of the image processing system, the color-conversion-profile generating section 2 has already generated a color conversion profile on the basis of pieces of data (CMYK data corresponding to a color charts and colorimetric data obtained by measuring output results of the CMYK data) provided by both the target device and the output device. When color image data as a subject of color proofreading is input to the image input section 3, a target sample is output from the target device on the basis of the input color image data. After the color converting section 4 converts the input color image data using the color conversion profile, the image output section 5 instructs the output device to output an image based on the converted color image data, as a proof sample.

After the target sample and the proof sample are output, a user compares the two samples with each other by observing the two samples and selects a color or region notable in terms of color reproduction error. The color-in-question designating section 6 designates the selected color or region as the designated color. For example, the color-in-question designating section 6 may allow a user to input (select) the designated color in such a manner that the color-in-question designating section 6 causes the image input section 3 to output and display the input color image data on a display unit and that a user designates a pixel or region of a color on the display screen by a pointing device or a mouse pointer, as the designated color. As another example, a pixel or region of a color as the designated color on the target sample may be measured with a colorimeter. A result of the measurement is input into the color-in-question designating section 6 through a keyboard or a communication line. When the color is designated by any one of these techniques, the color according to user's desire can be designated easily and speedily. Specifically, gray or skin color may be designated.

When the color is designated in this manner, the difference-information calculating section 7 calculates difference information regarding the designated color (or regarding a mean, a median or a modal value of colors in the case where the designated color contains plural colors) (S102). That is, the difference-information calculating section 7 converts CMYK data of the designated color (hereinafter referred to as "printing-press CMYK data") into device-independent color space data (hereinafter referred to as "printing-press $L^*a^*b^*$ data"). Moreover, the difference-information calculating section 7 converts the printing-press CMYK data using the color conversion profile generated by the color-conversion-profile generating section 2. Then, the difference-information calculating section 7 converts the converted CMYK data (hereinafter referred to as "printer CMYK data") into device-independent color space data (hereinafter referred to as "printer $L^*a^*b^*$ data"). The difference-information calculating section 7 calculates difference information (hereinafter referred to as "$\Delta L^*a^*b^*$") between the printing-press $L^*a^*b^*$ data and the printer $L^*a^*b^*$ data.

On this occasion, the difference-information calculating section 7 may perform color conversion (CMYK→$L^*a^*b$) with the predetermined color conversion table or the predetermined color conversion formula or with the color prediction model using a neural network. As another example, when the printing-press CMYK data and the printer CMYK data are output from the target device and the output device, respectively, results of the color conversion may be obtained by measuring the output results. As further another example, a combination of CMYK data of the color chart output from each device and a colorimetric result thereof may be used. In this case, a color approximate to the designated color may be selected from the color chart because the designated color does not always agree with any color in the color chart. Alternatively, a known prediction technique may be used for obtaining a color corresponding to the designated color on the basis of colors approximate to the designated color by a predictive arithmetic operation.

When the difference-information calculating section 7 calculates $\Delta L^*a^*b^*$, the correction processing section 8 corrects the colorimetric values obtained from the color chart output from the target device, on the basis of the difference information (S103). That is, the correction processing section 8 corrects original $L^*a^*b^*$ data, which are the colorimetric data of the color chart output from the target device, using $\Delta L^*a^*b^*$ calculated as difference information by the difference-information calculating section 7. The $L^*a^*b^*$ data after correction (hereinafter referred to as "corrected $L^*a^*b^*$") and the original CMYK data are combined with each other to thereby obtain data corrected by $\Delta L^*a^*b^*$ (hereinafter referred to as "corrected printing-press data").

Figure 3:
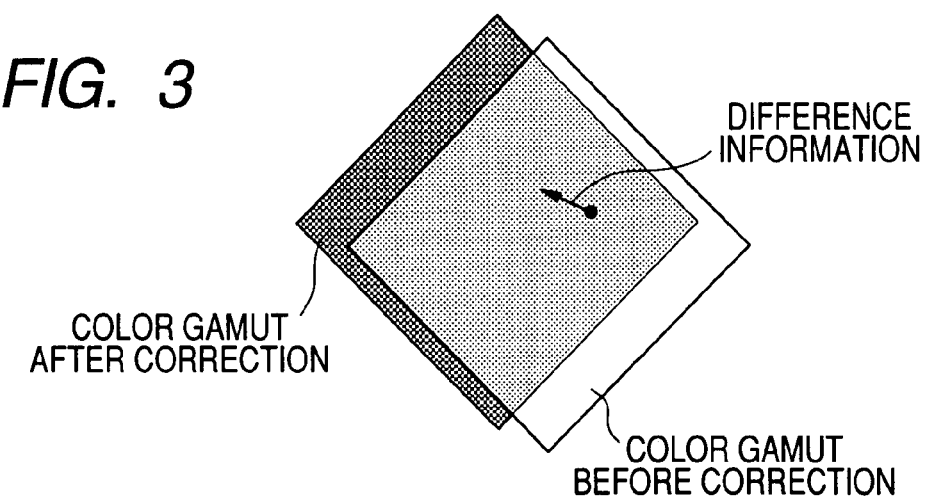
FIG. 3 is an explanatory view (1) showing the outline of correction processing.
Figure 4:
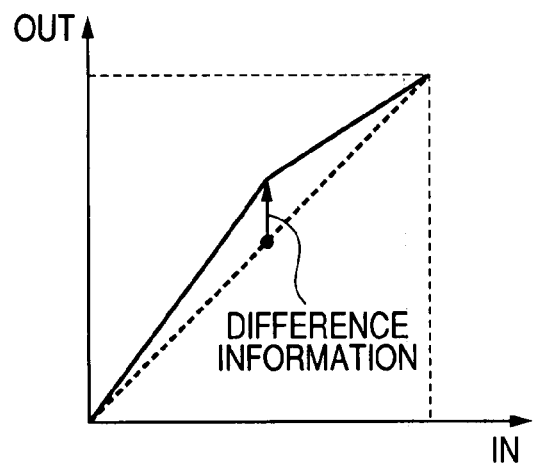
FIG. 4 is an explanatory view (2) showing the outline of correction processing.
Figure 5:
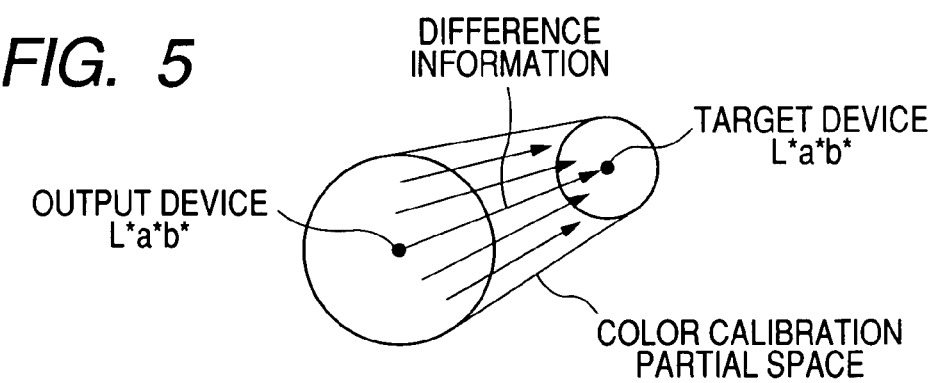
FIG. 5 is an explanatory view (3) showing the outline of correction processing.

On this occasion, the correction processing section 8 performs correction to obtain the corrected $L^*a^*b^*$ as follows. FIGS. 3 to 5 are explanatory views showing the outline of the correction processing.

As a correction made by the correction processing section 8, a predetermined arithmetic operation such as addition or subtraction of $\Delta L^*a^*b^*$ may be performed on the original $L^*a^*b^*$ data of the target device to thereby perform correction so that the whole of the color gamut is moved by the difference information, for example, as shown in FIG. 3.

For example, as shown in FIG. 4, the correction processing section 8 may reflect $\Delta L^*a^*b^*$ calculated as difference information onto an $L^*a^*b^*$ value corresponding to the designated color of the target device with respect to each axis of $L^*a^*b^*$ so that the correction amount decreases from $\Delta L^*a^*b^*$ as the position becomes farther from the $L^*a^*b^*$ value corresponding to the designated color, for example, as shown in FIG. 4. That is, the correction processing section 8 may vary correction amounts for the colorimetric values in accordance with distances on $L^*a^*b^*$ between the colorimetric values and the designated color. As a result, while unnatural correction with respect to the designated color can be avoided in the relation between the designated color and another color, excessive influence of the correction on the other color can be suppressed.

Furthermore, for example, as shown in FIG. 5, the correction processing section 8 may set a partial space containing an $L^*a^*b^*$ value corresponding to the designated color of the target device and an $L^*a^*b^*$ value corresponding to the value obtained by converting the designated color into a color space depending on the output device, as a color calibration partial space. The correction processing section 8 may selectively calibrate colors in the color calibration partial space. That is, the correction processing section 8 may correct a part of the colorimetric values, which is within a predetermined range (color calibration partial space) from the designated color on $L^*a^*b^*$ color space. Also by this measure, while unnatural correction with respect to the designated color can be avoided in the relation between the designated color and another color, excessive influence of the correction on the other color can be suppressed. Incidentally, because a known technique may be used (e.g. US 2004/057614 A, which is incorporated herein by reference in its entirety) in this case, the detailed description of the correction method will be omitted.

In any one of the cases shown in FIGS. 3 to 5, the correction processing section 8 may assign different weighs to L*, a* and b* components of ΔL*a*b* calculated by the difference-information calculating section 7. Then, the correction processing section 8 corrects L*a*b* values on the basis of the weighted ΔL*a*b*. That is, the correction processing section 8 corrects L*a*b* values using weighted difference information (ΔL*a*b*). Specifically, when, for example, gray is designated as the designated color, generally the correction processing section 8 perform weighting with importance given to a* and b* components because color tone is more important than brightness. On the other hand, when skin color is designated as the designated color, the correction processing section 8 may perform weighting with importance given to an L* component. By such weighting, correction processing can be performed in accordance with the characteristic of the designated color.

After the corrected printing-press data is obtained in this manner, the color-conversion-profile generating section 2 generates a color conversion profile on the basis of the corrected printing-press data again as shown in FIG. 2 (S104). As a result, a color conversion profile improved in color reproduction accuracy with respect to the designated color can be obtained.

In the series of steps, the step which must be made by the user is only the step of designating the color. Accordingly, color reproduction accuracy with respect to the designated color can be improved easily without necessity of any special technique.

Although the exemplary embodiment has been described as a specific embodiment of the invention, the invention is not limited to the contents of the embodiment and changes may be made suitably without departing from the gist of the invention. For example, color data need not to be CMYK data, L*a*b* data, etc. The measured value of a color, conversion of a color space, correction of color data, etc. are not limited to the contents of the embodiment and changes may be made suitably by use of a known technique. From these facts, it is conceived that the invention can be also applied to any other system than the color proof system as long as the system can perform color conversion by using a color conversion profile.

What is claimed is:

1. An image processing system programmed on a non-transitory computer-readable medium comprising:
    a profile generating section that generates a color conversion profile on a basis of (i) first colorimetric values obtained from a first color chart, which includes a plurality of first color patches and is output from a target device, and (ii) second colorimetric values obtained from a second color chart, which includes a plurality of second color patches and is output from an output device other than the target device, the color conversion profile used for converting color data depending on the target device into color data depending on the output device;
    a designating section that allows a user to designate a color region including a plurality of colors and uses one of a mean of the colors, a median of the colors and a modal value of the colors as a designated color;
    a calculating section that calculates difference information between (i) a first data value obtained by converting the designated color into a device-independent color space and (ii) a second data value obtained by converting the designated color using the generated color conversion profile into a second color and then converting the second color into the device-independent color space; and
    a correcting section that corrects the first colorimetric values based on the calculated difference information, wherein the correcting section causes the profile generating section to generate the color conversion profile again based on the corrected first colorimetric values and the second colorimetric values, and the correcting section assigns different weights to respective components of the different information calculated by the calculating section.

2. An image processing system programmed on a non-transitory computer-readable medium comprising:
    a profile generating section that generates a color conversion profile on a basis of (i) first colorimetric values obtained from a first color chart, which includes a plurality of first color patches and is output from a target device, and (ii) second colorimetric values obtained from a second color chart, which includes a plurality of second color patches and is output from an output device other than the target device, the color conversion profile used for converting color data depending on the target device into color data depending on the output device;
    a designating section that allows a user to designate a color region including a plurality of colors and uses one of a mean of the colors, a median of the colors and a modal value of the colors as a designated color;
    a calculating section that calculates difference information between (i) a first data value obtained by converting the designated color into a device-independent color space and (ii) a second data value obtained by converting the designated color using the generated color conversion profile into a second color and then converting the second color into the device-independent color space; and
    a correcting section that corrects the first calorimetric values based on the calculated difference information, the correcting section that causes the profile generating section to generate the color conversion profile again based on the corrected first colorimetric values and the second colorimetric values, wherein:
        the designated color is a color to be subjected to correction of a color reproduction error between a color image output from the target device and a color image output from the output device, and
        the correcting section assigns different weights to respective components of the difference information calculated by the calculating section.

3. The system according to claim 1, wherein the designating section allows a user to designate the color.

4. The system according to claim 1, wherein:
    the calculating section converts the designated color into the device-independent color space using a predetermined first color conversion table or a predetermined first color conversion formula, and
    the calculating section converts the second color into the device-independent color space using a predetermined second color conversion table or a predetermined second color conversion formula.

5. The system according to claim 1, wherein:
    the calculating section obtains the first data value by measuring the designated color output from the target device, and
    the calculating section obtains the second data value by measuring the second color output from the output device.

6. The system according to any one of claims 1 to 3, wherein:
    the calculating section selects a first color approximate to the designated color from the first color chart to obtain the first calorimetric value corresponding to the selected first color as the first data value, and the calculating section selects a second color approximate to the second color from the second color chart to obtain the second calorimetric value corresponding to the selected second color as the second data value.

7. The apparatus according to anyone of claims 1, 4 and 5, wherein the designating section displays a first color image output from the target device, and allows the user to designate the color region from the displayed first color image.

8. The system according to any one of claims 1 to 2, wherein:
the correcting section corrects the first colorimetric values based on the weighted difference information.

9. The system according to any one of claims 1 to 5, wherein:
the correcting section varies correction amounts for the first colorimetric values in accordance with distances on the device-independent color space between the first calorimetric values and the designated color, and
the correcting section corrects the first calorimetric values using the varied correction amounts.

10. The system according to any one of claims 1 to 5, wherein the correcting section corrects a part of the first colorimetric values, which is within a predetermined range from the designated color on the device-independent color space.

11. An image processing method programmed to be executable by a computer comprising:
generating, by a profile generating section of the computer, a color conversion profile on a basis of (i) first calorimetric values obtained from a first color chart, which includes a plurality of first color patches and is output from a target device, and (ii) second calorimetric values obtained from a second color chart, which includes a plurality of second color patches and is output from an output device other than the target device, the color conversion profile used for converting color data depending on the target device into color data depending on the output device;
allowing a user to designate, by a designating section of the computer, a color region including a plurality of colors and uses one of a mean of the colors, a median of the colors and a modal value of the colors as a designated color;
calculating, by a calculating section of the computer, difference information between (i) a first data value obtained by converting the designated color into a device-independent color space and (ii) a second data value obtained by converting the designated color using the generated color conversion profile into a second color and then converting the second color using the device-independent color space;
correcting, by a correcting section of the computer, the first calorimetric values based on the calculated difference information; and
generating, by the correcting section of the computer, the color conversion profile again based on the corrected first calorimetric values and the second colorimetric values,
wherein the correcting section assigns different weights to respective components of the difference information calculated by the calculating section.

12. A non-transitory computer readable medium storing a program causing a computer to execute image processing, the image processing comprising:
generating a color conversion profile on a basis of (i) first calorimetric values obtained from a first color chart, which includes a plurality of first color patches and is output from a target device, and (ii) second colorimetric values obtained from a second color chart, which includes a plurality of second color patches and is output from an output device other than the target device, the color conversion profile used for converting color data depending on the target device into color data depending on the output device;
allowing a user to designate, by a designating section of the computer, a color region including a plurality of colors and uses one of a mean of the colors, a median of the colors and a modal value of the colors as a designated color;
calculating difference information between (i) a first data value obtained by converting the designated color into a device-independent color space and (ii) a second data value obtained by converting the designated color using the generated color conversion profile into a second color and then converting the second color using the device-independent color space;
correcting the first colorimetric values based on the calculated difference information;
and generating the color conversion profile again based on the corrected first calorimetric values and the second colorimetric values, and
assigning different weights to respective components of the calculated difference information.

\* \* \* \* \*